United States Patent [19]

Rau

[11] Patent Number: 5,044,614
[45] Date of Patent: Sep. 3, 1991

[54] SHOCK ABSORBER SPRING ADJUSTER

[76] Inventor: John A. Rau, 10005 Obsidian Dr., Reno, Nev. 89506

[21] Appl. No.: 482,902

[22] Filed: Feb. 22, 1990

[51] Int. Cl.$^5$ .............................................. F16F 13/00
[52] U.S. Cl. .................................... 267/221; 267/175; 267/177; 267/255; 280/710
[58] Field of Search ............... 267/255, 170, 175, 177, 267/221, 222; 280/710, 712

[56] References Cited

U.S. PATENT DOCUMENTS

| | | | |
|---|---|---|---|
| 2,889,144 | 6/1959 | Walker | 267/221 |
| 2,896,938 | 7/1959 | Walker | 267/221 |
| 3,181,852 | 5/1965 | Paller | 267/221 |
| 4,183,509 | 1/1980 | Nishikawa et al. | 188/319 |
| 4,616,810 | 10/1986 | Richardson et al. | 267/221 X |
| 4,744,444 | 5/1988 | Gillingham | 267/221 X |

FOREIGN PATENT DOCUMENTS 2624087 12/1976 Fed. Rep. of Germany ...... 267/221
2075630 11/1981 United Kingdom ........... 188/321.11

Primary Examiner—George E. A. Halvosa
Attorney, Agent, or Firm—Richard C. Litman

[57] ABSTRACT

A shock absorber assembly includes a piston/tube shock mechanism provided with adjustment devices permitting variation of the effective length and thus operating parameters, of a coil spring surrounding the shock mechanism. Adjustment is obtained by the vertical displacement of a member surrounding a body sleeve disposed exteriorly of the shock mechanism and wherein this vertical displacement alters the elevation of one end of the coil spring. A lock nut secures the obtained adjustment and both the member and nut may be manipulated with a simple tool cooperating with a specific configuration on the periphery of the member and nut.

6 Claims, 1 Drawing Sheet

SHOCK ABSORBER SPRING ADJUSTER

REFERENCE TO CROSS-RELATED APPLICATION

This application discloses subject matter that was disclosed in application Ser. No. 07/265,554, filed Nov. 1, 1988, abandoned.

FIELD OF THE INVENTION

This invention relates generally to an improved shock absorber assembly and more particularly, to a shock absorber provided with an adjustment mechanism permitting simple and rapid alteration of the effective length of the coil spring concentrically disposed about the telescoping shock absorber components.

BACKGROUND OF THE INVENTION

Many vehicles use a suspension system consisting of coil springs concentrically mounted over telescoping tubular shock absorbers. An example is the MacPherson suspension system commonly used on many models of small cars. This system has also become a popular modification for other systems, especially in off road vehicles and/or four wheel drive vehicles. From time to time it is desirable, if not necessary, to adjust the compression rate or effective length of the springs in such assemblies for a number of possible reasons, including weakening of the springs over a prolonged period of time, heavy or uneven loads carried in the vehicle, and changing road or terrain conditions.

DESCRIPTION OF THE RELATED ART

Adjustable shock absorbers have typically utilized collars secured with set screws and locked into the shock absorber body, or clamps surrounding the body. Such examples will be found in Stresnak et al U.S. Pat. No. 3,010,714 of Nov. 28, 1961, Schmidt U.S. Pat. No. 3,043,581 of July 10, 1962, and Osterhoudt U.S. Pat. No. 3,096,084 of July 2, 1963. The forces necessary to secure these collars or clamps to preclude their movement along the shock absorber body under conditions of very high spring compression, such as occurs when a heavily loaded vehicle rapidly traverses uneven terrain, may be sufficient to distort the shock absorber body to the extent that the shock absorber is damaged and/or no longer operable. Additionally, such devices fail to offer a simple manner of obtaining a precise or minute readjustment.

Although devices as described above are adjustable, the nature of their attachment to the smooth shock absorber body requires that in order to perform such an adjustment the concentric surrounding spring must be compressed by means of special tools not normally found outside of vehicle maintenance and repair shops. The forces contained by these tools while holding such a spring in compression may also create some hazard should one or more of the spring compression tools slip.

Benya et al U.S. Pat. No. 4,366,969 of Jan. 4, 1983 seeks to overcome the problem of potential slippage by welding the collar to the shock absorber body. This can only be done during the manufacture of the shock absorber, as such a weld could not be successfully accomplished in the field or in a repair shop. The heat from such a weld would in all likelihood distort the shock absorber body, thereby rendering it inoperable. Performing a welding operation on a prefabricated shock absorber would also damage other internal components, such as elastomer seals of various types and hydraulic fluid, as well as the metals used in the construction of the shock absorber, by locally altering the heat treatment of such metals.

By using a finite number of fixed steps or notches for adjustment in combination with a rotating collar, the above Benya et al patent does eliminate the need for spring compression tools for adjustment. In doing so, however, yet another problem is created, since such a collar arrangement is by its nature limited both in terms of the total length of adjustment available as well as the relatively small number of individual, finite adjustments available.

SUMMARY OF THE INVENTION

By the present invention, an improved apparatus for providing selective adjustment of the length and compression of coil springs mounted concentrically about telescoping tubular shock absorbers is disclosed.

Accordingly, one of the objects of the present invention is to provide an improved device for quickly and simply adjusting coil springs arranged in the above manner on various vehicles or devices where such a system is used.

Another object of the present invention is to provide a means of adjustment which is adjustable over a relatively wide range.

Still another object of the present invention is to provide an infinitely variable means of adjustment.

Yet another object of the present invention is to provide a means of adjustment which eliminates the need for spring compression tools.

A further object of the present invention is to provide a device which cannot slip out of adjustment under conditions of extreme loading.

Another object of the present invention is to provide a device which may be retrofitted to a standard production, readily available telescoping tube type shock absorber.

An additional object of the present invention is to provide a means of adjustment which may be performed while the spring and shock absorber are under load and thus which does not require removal of the load prior to accomplishing the adjustment.

With these and other objects in view which will more readily appear as the nature of the invention is better understood, the invention consists in the novel construction, combination and arrangement of parts hereinafter more fully described, illustrated and claimed, with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figures 1, 2:
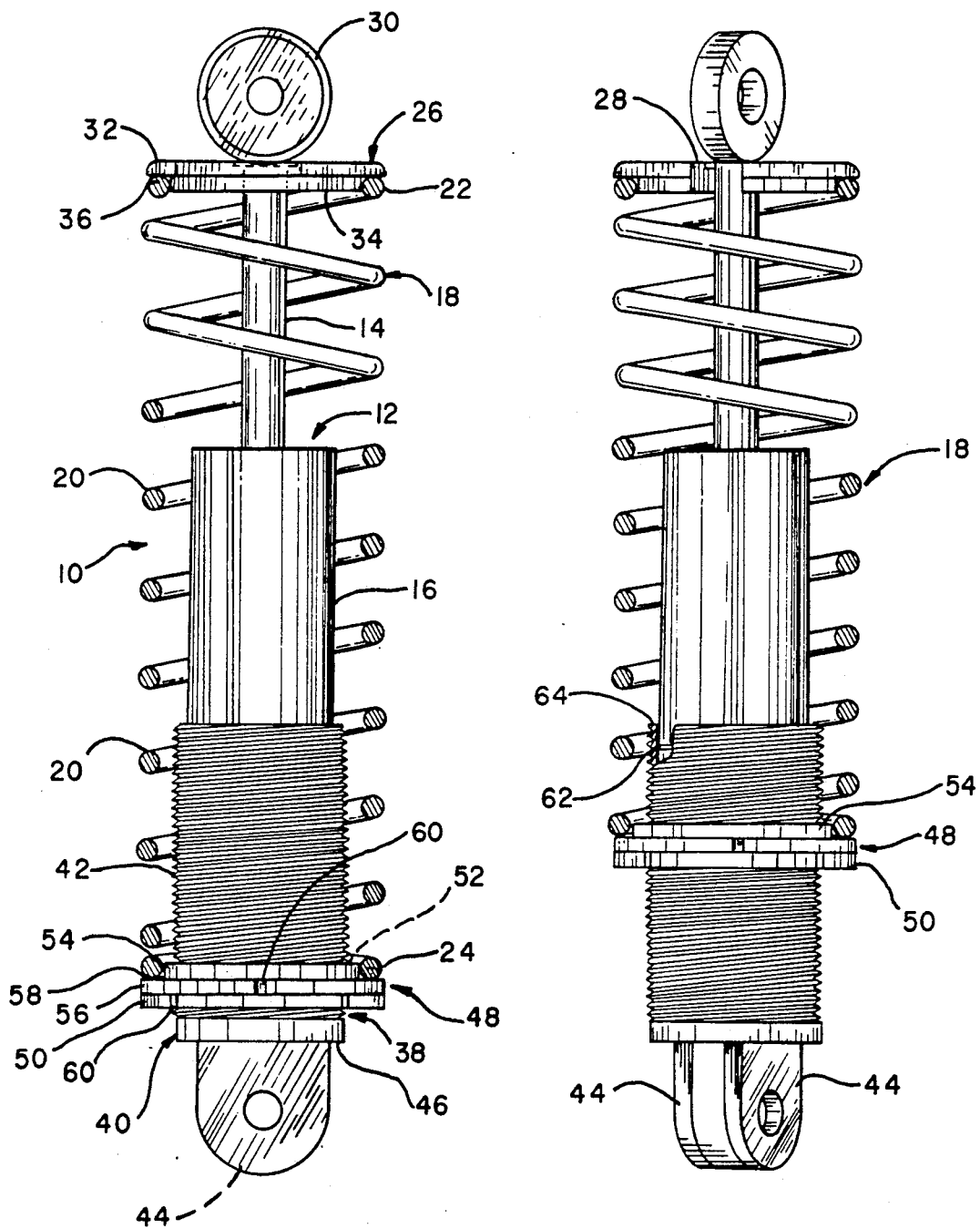
FIG. 1 is side elevation of the present invention installed on a telescoping tubular shock absorber and wherein the adjustment mechanism is set to a position just short of its fully extended range.
FIG. 2 is a perspective view similar to FIG. 1 and illustrates the various components as they appear when the adjustment mechanism is set to provide a fore-shortened or more compressed condition of the coil spring.

Referring now to the drawings, particularly FIG. 1, the present invention will be seen to comprise a shock absorber assembly, generally designated 10, and which includes the usual shock sub-assembly 12 having a piston rod 14 cooperating with a shock cylinder or tube 16. The details of the internal construction of the sub-assembly 12 will be understood to form no part of the present invention since, any one of various well known sub-assemblies may be utilized in combination with the mechanism providing the adjustability according to the present invention. Cooperating with the shock mechanism 12 is the well known compression spring 18 comprising a unitary steel member providing a plurality of coils 20 terminating respectively, in an upper end 22 and lower end 24. This spring 18 is concentrically disposed about the shock sub-assembly 12 with its upper end 22 suitably retained against longitudinal displacement by means of an abutment member comprising an upper spring retainer clip 26. This clip includes a circular plate provided with a radial slot 28 adapted to receive the piston rod 14 and will be understood to be constantly urged by the spring against the stop presented by a knuckle or piston rod end 30 the latter of which provides the top attachment means for the shock absorber assembly 10. The top surface 32 of the retainer clip 26 is preferably planar to present a smooth engagement with the rod end 30 while the lower surface of the clip will be seen to include a depending bottom section 34 of less diameter and forming a peripheral, circular recess 36 within which the spring upper end 22 is seated. To provided the adjustability of the present invention, means are included to alter the height or effective length of the spring 18. This is accomplished by the selective manipulation of displaceable spring abutment means constantly engageable with the spring lower end 24. This means will be seen to comprise an end or adjustment sub-assembly 38 including a cylindrical body sleeve 40 concentrically disposed about the shock tube 16 and having external threads 42 thereon.

The lower end of the shock absorber tube 16 projects from the bottom of the sleeve 40 and is affixed to the associated vehicle in the conventional manner, along with two laterally spaced apart flanges 44—44 depending from the bottom section 46 of the sleeve. This bottom section will be understood to be void of the threads 42 and thus serves as a bottom stop for the about to be described adjustment components carried by the sleeve threads 42.

As will be seen most clearly in FIG. 1 of the drawing, an adjusting nut 48 and adjacent lock nut 50 are concentrically mounted about the body sleeve 40, with the adjusting nut being uppermost. Both are ring members provided with internal threads 52 mating with the threads 42 on the body sleeve 40. Although continuous threads are shown in the drawing, quite obviously suitable alternative interfitting means may be utilized to allow for the vertical displacement of the nut and lock nut. The uppermost adjusting nut 48 includes an upper section 54 having a circular periphery defining a diameter which is slightly less that that of the spring coils 20 while an integral lower section 56 extends outwardly therefrom to offer a diameter no less than that of the spring coils and to provide an upwardly facing shoulder 58 upon which the spring lower end 24 constantly bears. The above mentioned lock nut 50, which may be of the same outer diameter as that of the adjusting nut lower section 56, includes suitable tool-receiving means such as notches 60 on its periphery, as does also the periphery of the adjusting nut lower section 56. With circular periheries on the nut and lock nut, the above mentioned notches 60 readily accept a simple tool such as a spanner wrench. Alternatively, flats (not shown) may be formed on the nut and lock nut peripheries to accept adjustable or slip-joint pliers or the like. The operation of the adjustment mechanism may now be related, with an understanding of the above described construction. The shock absorber assembly 10 as illustrated in FIG. 1 represents the relationship of the various components as they appear when the minimum compressive force of the spring 18 is in effect. This follows since the adjustment nut 48 and lock nut 50 are located in their lower most position, in abutment with the body sleeve bottom section 46. To increase the applicable force of the spring 18, its effective length must be fore-shortened and this is obtained by using an appropriate tool, such as a spanner wrench (not shown) about the periphery of the adjusting nut 48. In this manner, as the threaded nut 48 is angularly displaced, it is vertically advanced along the threads 42 of the body sleeve 40, thereby progressively further compressing the spring as the coils 20 thereof are moved closer to one another. After the nut 48 has been shifted to the desired position, the lower most lock nut 50 is similarly moved upwards into engagement with the adjusting nut 48. The same tool may be used for this latter displacement or, alternatively, the lock nut may be initially shifted by hand and thence snugged, in a jam fashion, against the adjusting nut by means of the tool. Accordingly, it will be appreciated that the lock nut serves to retain the adjusting nut in its current position so that as the shock absorber assembly 10 is subsequently used in a vehicle, the vibrations, etc. will not alter the preset adjustment position. The combination of constant spring pressure on the adjusting nut and the forceful jamming of the lock nut thereagainst insure the stability of the mechanism.

To preclude damaging frictional contact as well as to dampen noise and prevent entry of foreign material during operation of the present assembly 10, sealing means such as an O-ring seal 62, is provided on the interior of the body sleeve 40, preferably adjacent its top edge 64. Quite obviously, alternate sealing means, such as a coating of suitable material, may be applied to the sleeve interior surface.

From the foregoing description it will be appreciated that an improved shock absorber assembly has been presented and which offers an extremely simple, yet effective manner for the quick and positive adjustment of the spring member in order to vary its effective length in accordance with the parameters to be encountered during use of the associated vehicle.

It is to be understood that the present invention is not limited to the sole embodiment described above, but encompasses any and all embodiments within the scope of the appended claims.

What is claimed is:

1. A shock absorber assembly comprising;
    a shock sub-assembly including a piston rod and telescopically cooperating tube, said tube having an end projecting therefrom for affixing to a vehicle,
    one piece radially slotted retainer means adjacent one end of said piston rod,
    a separately and freely removable one piece elongated tubular body sleeve surrounding and adjacent an end of said tube, said sleeve having a smooth inner bore and opposite open ends including a top and a bottom, said body sleeve containing sealing and damping means located adjacent said top open end and between said inner bore and said shock tube, body sleeve mounting means comprising spaced apart parallel flanges projecting from said bottom of said body sleeve, said flanges having apertures bored therethrough to permit common mounting of said body sleeve bottom with said tube projecting end, an adjusting member surrounding said body sleeve, thread means joining said adjusting member to said body sleeve, said thread means allowing selective axial displacement of said adjusting means along said body sleeve, a coil spring having opposite ends respectively abutting said retainer means and adjusting member, and surrounding said piston rod, tube and body sleeve, whereby angular movement of said adjusting member alternately upwardly and downwardly displaces said adjusting member relative to said body sleeve to respectively increase or decrease the effective length of said coil spring.

2. A shock absorber assembly according to claim 1 including,
a lock member carried by said body sleeve on a side of said adjusting member opposite that side abutting said coil spring.

3. A shock absorber assembly according to claim 1 wherein,
said adjusting member includes a nut, and
tool engaging means on said nut.

4. A shock absorber according to claim 3 wherein,
said tool engaging means includes notches.

5. A shock absorber assembly according to claim 1 wherein,
said adjusting member includes a lower section having a diameter no less than that of said coil spring,
an upper section on said lower section and defining a diameter less than that of said coil spring.

6. A shock absorber assembly according to claim 1 wherein; said sealing and damping means comprises an O ring.

* * * * *